US005884806A

United States Patent [19]

Boyer et al.

[11] Patent Number: 5,884,806

[45] Date of Patent: Mar. 23, 1999

[54] DEVICE THAT COUNTS AND DISPENSES PILLS

[75] Inventors: Joseph H. Boyer; James P. Boyer, both of Johnson City; Henry Gerlitz, Sidney, all of N.Y.

[73] Assignee: Innovation Associates, Inc., Johnson City, N.Y.

[21] Appl. No.: 759,279

[22] Filed: Dec. 2, 1996

[51] Int. Cl.[6] .............................. G07F 11/00; G06F 17/00

[52] U.S. Cl. .................................... 221/75; 221/2; 221/7; 221/9; 221/13; 364/479.01; 364/479.02; 364/479.06; 364/479.07; 364/479.11

[58] Field of Search ......................... 364/479.01, 479.02, 364/479.06, 479.07, 479.11, 479.12, 479.13, 479.14; 221/75, 13, 200, 7, 2, 258, 9

[56] References Cited

U.S. PATENT DOCUMENTS

| | | | |
|---|---|---|---|
| 3,782,590 | 1/1974 | Apfel | 221/13 |
| 3,823,844 | 7/1974 | Linkemer et al. | 221/13 |
| 4,600,119 | 7/1986 | Olson | 221/75 |
| 4,995,531 | 2/1991 | Summers | 221/75 |
| 5,014,875 | 5/1991 | McLaughlin et al. | 221/2 |
| 5,086,945 | 2/1992 | Corella | 221/258 |
| 5,205,436 | 4/1993 | Savage | 364/479.06 |
| 5,213,232 | 5/1993 | Kraft et al. | 221/277 |
| 5,292,029 | 3/1994 | Pearson | 221/2 |
| 5,303,844 | 4/1994 | Muehlberger et al. | 221/75 |
| 5,337,919 | 8/1994 | Spaulding et al. | 221/2 |
| 5,502,944 | 4/1996 | Kraft et al. | 364/479.12 |

*Primary Examiner*—William E. Terrell
*Assistant Examiner*—Wonki Park
*Attorney, Agent, or Firm*—Salzman & Levy

[57] ABSTRACT

The present invention features a pill-dispensing system which has a number of standardized, or universal-type, modules. Each module has a rotating, helix-drive mechanism, which is rotationally controlled by a microprocessor. The helical-drive mechanism features several improvements, both in the drive mechanism and in the software control of the rotational drive system by the microprocessor that allows for the dispensing of pills of all shapes and sizes one at a time. The helix of the drive is securely mounted within a rotatable, hollow tube. A stationary collar is mounted adjacent the upper end of the rotating tube. The rotating helix extends into the stationary collar and forces pills from the hollow tube to the dispensing edge of the stationary collar. A hopper positioned at the input end, or mouth of the tube, feeds a batch quantity of pills to the drive mechanism. The tube is angled upwardly from the mouth portion, so that the pill-dispensing end is positioned above the input end. In this fashion, the pills that are fed through the tube move upwardly against gravity.

21 Claims, 12 Drawing Sheets

Block Diagram
Computer, Microprocessor and Control Electronics

DEVICE THAT COUNTS AND DISPENSES PILLS

RELATED PATENT APPLICATIONS

This patent application is related to U.S. patent applications Ser. Nos. 643,679 and 643,676, both filed on May 6, 1996, assigned to the common assignee, and hereby incorporated by reference.

FIELD OF THE INVENTION

The present invention pertains to devices that count and dispense pills and, more particularly, to an automated dispensing- and prepackaging system, featuring a standard module capable of handling a complete range of pill sizes and shapes, a module which can also be multiply incorporated into a single workstation operated by one or more people.

BACKGROUND OF THE INVENTION

The field of pill-dispensing features many different mechanisms that are designed to recognize, sort and count tablets and capsules of all types and sizes. Many of these devices are problematical, due to their lack of reliability. In order for one apparatus to properly recognize and/or sort differently-sized pills, for instance, it has often been necessary to modify dispenser design, so as to accommodate tablets of particular shapes and sizes. Oftentimes, adjustments must be made to a machine during the operation thereof. Such changes greatly inhibit the use of such devices in facilities that are automated or are continuously run.

The present invention illustrates a new apparatus that is both reliable and able to handle a wide variety of tablets and capsules, without the basic design requiring adjustments or modification thereto.

The current invention is a standardized or universal-type module that can be easily loaded with a hopper having all types of tablets and capsules of varying size and shape. The module has a simple, screw-type feed and dispensing mechanism that can operate at different speeds to accommodate the different pills. A multiplicity of modules can be arrayed in a workstation that is computer-controlled. The speed of each dispensing mechanism is also computer-controlled, so that each module can be individualized for a specific pill. In this manner, the workstation can dispense a wide range of pills as needed in any sort of applicable prescription filling facility (e.g., retail pharmacy, hospital pharmacy, clinics, nursing home, mail-order concern).

This invention is more cost-effective and compact than existing dispensers. It is able to count accurately at a speed commensurate with a high-throughput pharmacy fulfillment system. Its design allows for its use in banks or arrays which are compact enough to allow a single operator to handle 200 or more dispensers from a single workstation. The form of the device also allows its use in a pre-existing, automated dispensing- or prepackaging facility, which can accommodate the invention quite affordably.

As aforementioned, this invention provides a basic design that can handle a complete range of tablet and capsule sizes and shapes, without requiring different mechanical operations or adjustments. The inventive, basic design is controlled electronically. A microprocessor is programmable so as to provide different drive voltages that adjust the timing and operation of the mechanism, which, in turn, set the device to operate specifically with respect to a particular pill or tablet.

The mechanism of the invention features a sloped tube containing a helical, interior ridge. The tube is set at an angle to the horizontal plane. With its helical ridge, the sloped tube is rotated, causing tablets fed to the mouth of the tube to move upwardly along the tube, against gravity, and thereby becoming separated, either individually or into smaller groups. As the pills reach the end of the tube, they are individually separated, and can be accurately dispensed from the end thereof. The falling pills are then detected individually by photodetector cells, and are thereby reliably counted. The computer controlling the dispensing operation is programmed to recognize a double-feed or a broken, fragmented tablet.

U.S. Pat. No. 5,213,232, issued to KRAFT et al, discloses an apparatus for dispensing single units such as pills. A generally circular, walled container has a bottom for holding the units and a discharge area located distally from the bottom for receiving the single units and for discharging them upon manual rotation. A helical spiraled rib member is located on the circular walled container for creating, during rotation, a continuously variable inclined surface along the helical spiraled rib member and the circular walls of the container. In addition to requiring the bottom (making it impossible to incorporate in a system with a hopper), the system is not adapted to be automatically advanced.

Screw-feed separation and photoelectric counting are known in the art. The invention features such significant improvements over the existing concept, however, that, while the basic simplicity and reliability are retained, both speed and accuracy are enhanced. The key to the maintenance-free reliability sought is in its basic simplicity. The incorporated improvements to the basic design provide significant changes in operational features, speed and accuracy. Therefore, while being sophisticated, the invention retains basic simplicity.

Providing accurate, pill-dispensing counts for differently-sized and -shaped tablets via a single mechanism is a complex problem sought by many, and accomplished by few. It is the purest form of invention which takes a complex problem and makes it simple, as has been done here.

The inventive mechanism improves the separation of the tablets within the screw-feed, a process often referred to in this art as singulation. The invention is an improvement over a basic, screw-feed mechanism, making certain that only single pills emerge from the dispensing end of the tube.

The inventors have discovered that several factors influence the singulation process in the screw-feed of the present invention, to wit: (a) the size and shape of the helical ridge, (b) the slope of the tube containing the helical ridge, (c) the pitch from one turn of the helical ridge to the next, and (d) certain other shapes interior to the device must be designed to cause some of the tablets to tumble backward over the helical ridge, thus stringing out the forward portion of the tablet mass into a single-file configuration within the helix. The design of this backward tumbling ensures singulation. The backward tumbling limits the number of tablets being carried forward by any one 360° turn of the helix. This, in turn, causes the tablets to emerge from the dispensing end of the device only one at a time.

The screw-feed mechanism of the pill-dispensing apparatus of this invention rigidly connects a helical ridge, or a helix, to the inside wall of a rotating, hollow tube. The ridge is designed to extend beyond the upper end of the tube for approximately one turn. At this end, the helix is encased by, but is not connected to, a stationary collar having the same diameter as that of the rotating tube. As the helix advances within the stationary collar, it pushes tablets out of the collar. The pills typically exit only one at a time, and are then reliably counted by a photoelectric device. The shape of the helical ridge causes the tablets to lie essentially flat as they are pushed along this stationary collar. This further ensures that the pills will fall out of the collar only one at a time.

The helical ridge is bent slightly at its output end (towards the output end of the helix), which causes a further separation of the tablets as they fall from the dispensing end of the collar. The helix pitch is lengthened over a forward portion thereof, in order to effect better separation of the pills as they travel along the tube.

Two protrusions, or, nubs, are built into the inside of the rotating hollow tube, between two turns of the helix. These protrusions assist in causing excessively large tablets to tumble backwardly towards the input end of the helix. The leading edge of the helical ridge is angled downwardly and to the left, in order to urge the tablets backwardly toward the mouth of the hollow tube. Thus, large pills that were successful in moving towards the dispensing end are pushed backwards, and the forward pill mass achieves a greater separation from the main batch.

Two small protrusions are built into the face of the helical ridge, up against the inside of the rotating tube. These small protrusions are disposed on the output side of the ridge approximately one, and one-and-a-half turns, respectively, on the helix, from its output end. These protrusions assist in causing excessively small pills to tumble backwardly towards the input end of the helix. Thus, small pills that were successful in moving towards the dispensing end are pushed backwards, and the forward pill mass achieves a greater separation from the main batch.

Thus, the inventive protrusions provide a built-in, inherent compensation for both small- and large pill separation. Thus, the inventive apparatus does not require operational adjustments, which are so common in the devices of the prior art.

As the helix-tube combination turns, it picks up tablets from a hopper, bringing them into the tube. At the input end, or, mouth, of the helix-tube, a trough is disposed adjacent the bottom of the hopper that contains the supply of tablets. The trough is pivoted at one end away from the mouth of the helix-tube, and is bias-spring supported at a point adjacent the mouth thereof. This trough is thereby enabled to tilt downwardly at its end, adjacent the helix-tube mouth. In the event of a tablet jam at the input end (mouth portion), the force and the weight of the jam will cause the pivoted trough to tilt against its spring biasing, relieving the pressure of the jam, and thus allowing tablets to once again flow freely into the helix-tube.

The microprocessor controlling the dispensing mechanism stops the rotation of the tube when the number of tablets counted by the device approaches the number desired for a given dispensing count. Afterwards, the microprocessor intermittently rotates the tube in both a forward and reverse direction a fraction of a turn, waiting between successive, intermittent jogs for a signal from the photodetector that the final tablet in the count has dropped therethrough. This intermittent rotation at the end of the dispensing cycle reduces the tendency of multiple pills to drop from the end of the tube. In this fashion, the microprocessor control ensures that an accurate, final count of tablets will be obtained. The size of the small, incremental angle and the duration of the wait are adjusted in software to be optimal for the size of the pills being dispensed. In this way, the only adjustment required to accommodate the different sizes of pills is accomplished in software that affects the helix rotation only. No mechanical modifications or adjustments are required therefor.

As a result of maintaining the simple concept of a screw-feed drive, the device maintains its overall reliability, which is further enhanced by the improvements. The refinements in both hardware and software to the basic, helical, screw-feed drive achieve simplicity, reliability, low cost and compactness for this pill-dispensing system.

SUMMARY OF THE INVENTION

In accordance with the present invention, there is provided a pill-dispensing system comprising a plurality of standardized, or, universal-type, modules. Each module comprises a rotating, helix-drive mechanism, which is rotationally controlled by a microprocessor. The helical-drive mechanism features several improvements, both in the drive mechanism and in the software control of the rotational drive system by the microprocessor that allows for the dispensing of tablets of all shapes and sizes one at a time. The helix of the drive is fixedly mounted within a rotatable, hollow tube; a stationary collar is mounted adjacent the upper end thereof. The rotating helix extends into the stationary collar and forces pills from the hollow tube to the dispensing edge of the stationary collar. A hopper disposed at the input end, or, mouth, of the tube, feeds a batch quantity of pills to the drive mechanism. The tube is angled upwardly from the mouth portion, so that the pill-dispensing end is positioned above the input end. In this fashion, the pills that are fed through the tube move upwardly against gravity. As the tube-and-helix combination turns, it picks up tablets from the hopper, bringing them into the tube.

At the input end, or, mouth, of the helix (adjacent the bottom of the hopper that contains the supply of tablets), there is a trough. The trough is pivoted at one end thereof, so that it will pull away from the helix. The trough is bias-supported by a spring at a point adjacent the mouth of the tube. This trough is thereby enabled to tilt downwardly at its end closest to the mouth of the tube. In the event of a tablet jam at the input end of the tube, the force and weight of the jam will cause the pivoted trough to tilt against its spring-biasing, thus relieving the pressure of the jam and allowing tablets to once again flow freely into the rotating, helix-tube combination.

The invention provides mechanical interrupts, or, protrusions, within the tube that affect the pill flow. These mechanical interrupts within the tube are designed to urge both large and small tablets backwardly, so that gravity will force some of the forwardly mobile pills back into the initial batch. These built-in, flow diverters provide a means by which both small or large pills alike can be separated along the axis of the tube without need for mechanical adjustment. As the tube continues to rotate, these backwardly urging flow diverters singulate the pill mass into a single-file configuration, so that pills dropping from the edge of the collar are dispensed one at a time.

The tablets falling from the collar are sensed by a photodetector disposed adjacent thereto. This photodetector sends a signal to the microprocessor when it detects a pill that has fallen from the edge of the collar. The microprocessor controlling the dispensing mechanism stops the rotation of the tube, when the number of tablets counted by the device approaches the number desired for a given dispensing count. Afterwards, the microprocessor intermittently rotates the tube a partial turn through a small angle, and waits between successive, intermittent forward and/or reverse jogs for a signal from the photodetector that the final tablet in the count has dropped therethrough. This intermittent rotation at the end of the dispensing cycle reduces the tendency of multiple pills to drop from the end of the tube.

In this fashion, microprocessor control ensures that an accurate, final count of tablets is obtained. The size of the incremental angle and the duration of the wait are adjusted in software to be optimal for the size of the pills being dispensed. In this way, the only adjustment required to accommodate the different sizes of pills is accomplished in software that affects the helix rotation only. No mechanical modifications or adjustments are required therefor. The microprocessor controls the normal flow rotation of the tube via rotational-control software. The software rotates the tube at different speeds to effect an optimal flow for specifically-sized and -shaped pills.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

Generally speaking, the invention features a pill-dispensing system that uses a screw-feed mechanism which dispenses pills of all shapes and sizes. The screw-feed mechanism is designed to change the material flow through the screw-feed area, or flow zone, to effect singulation of the tablets, i.e., a single-file configuration of flow. The term “pill” shall hereinafter be used to refer to any discrete pill, tablet or capsule which forms a delivery system for a drug or other pharmaceutical preparation. This singulation of the tablets or capsules passing through the screw-feed zone is accomplished by interrupting, delaying and otherwise urging the tablets backwardly into the pill mass. The pill mass features a bulk loading thereof from a hopper, with the pills entering at the input end, or, mouth, of a screw-feed tube. A photodetector disposed at the output, or, dispensing end, of the screw-feed tube counts the number of pills falling off the edge of the tube, and sends a signal to a microprocessor. The microprocessor controls the rate at which the screw-feed tube rotates, which depends upon the size and shape of the tablets or capsules passing therethrough. The rotational control, however, is interrupted by the microprocessor, as the pill count nears the desired amount. At this point, the screw feed is intermittently rotated, or jogged (forward or reversed directions), so that only a single pill emerges from the end of the screw-feed tube. In this manner, the dispensing system ensures a correct count.

Figure 1:
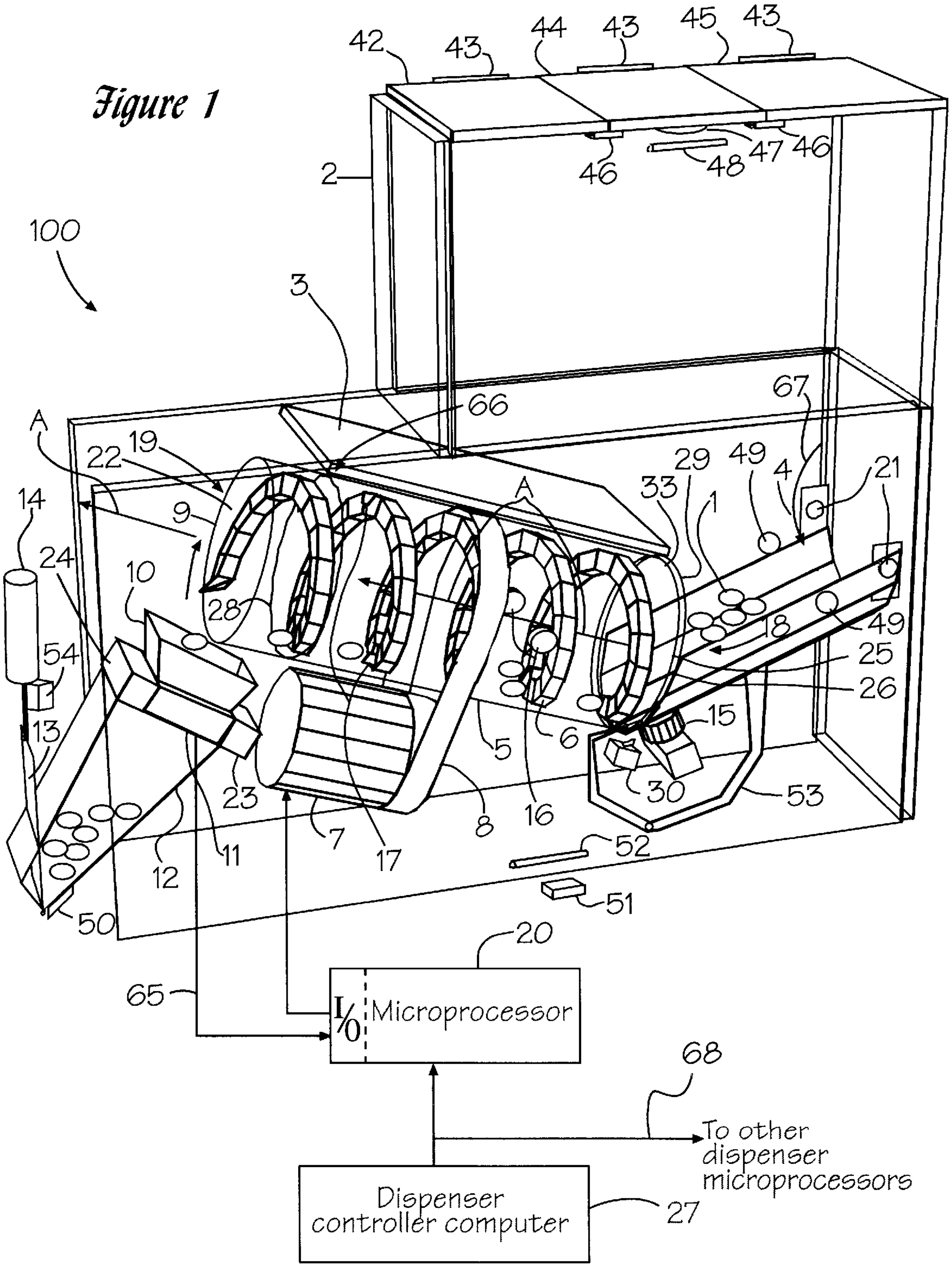
FIG. 1 illustrates a perspective, schematic view of the pill-dispensing system of this invention.
Figure 2:
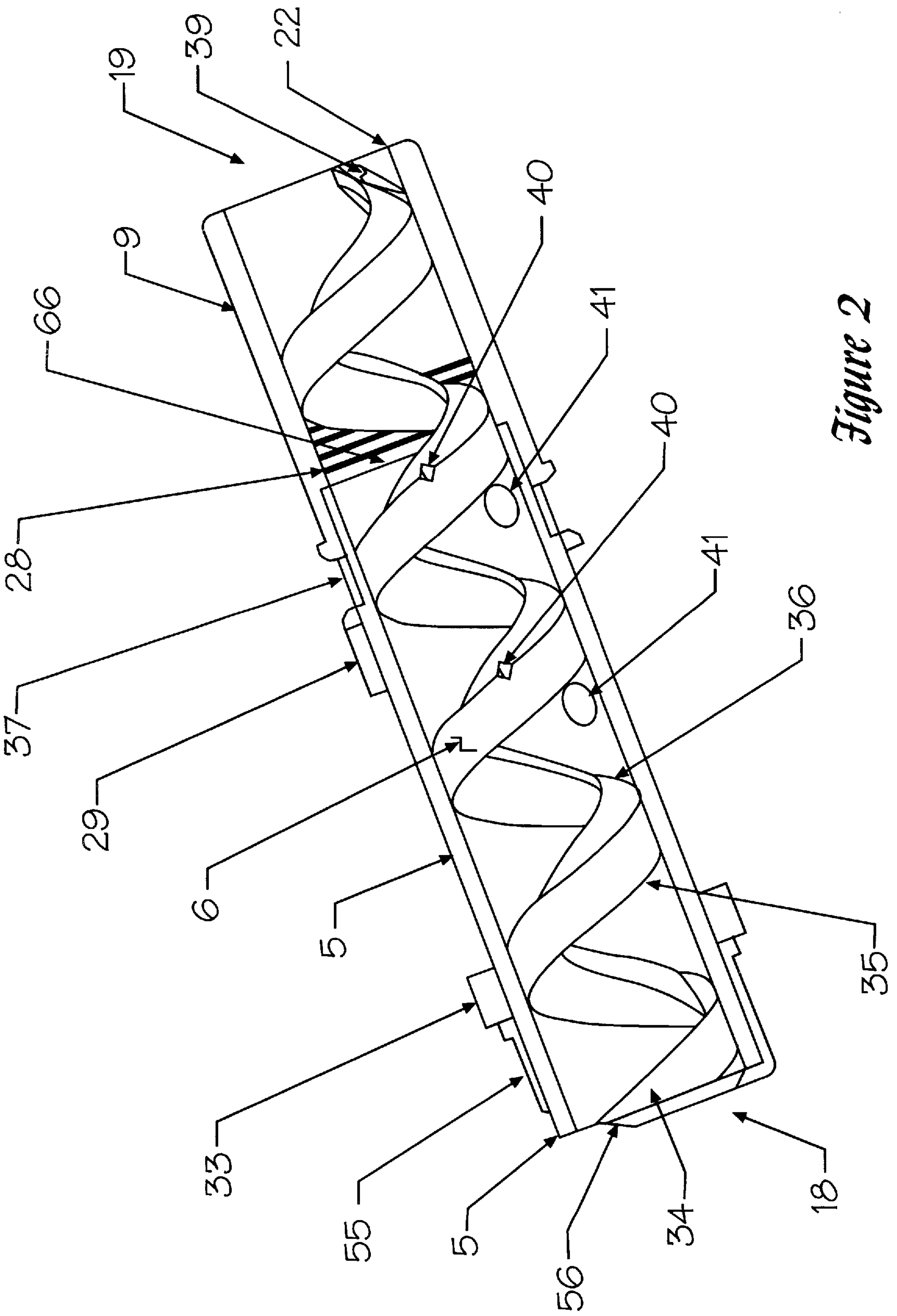
FIG. 2 depicts a perspective view of a helix shown in a sectional view of a helix-tube and the adjacent, stationary collar of the dispensing mechanism shown in FIG. 1.

Now referring to FIG. 1, the dispensing system 100 of this invention is illustrated. The dispensing system 100 comprises a hollow tube 5 which is equipped with an interior, helical ridge 6, which will hereinafter be referred to as helix 6. The helix 6 is rigidly connected to the inside wall of the hollow tube 5. The tube 5 is inclined to the horizontal plane nominally between 10 and 30 degrees. The dispensing end 19 of the mechanism is disposed vertically above the input end, or, mouth 18, of tube 5, so that tube 5 is inclined towards the dispensing end 19. The incline of tube 5 defines a central, longitudinal, pill-flow axis, as shown by arrows A. The tube 5, shown in greater detail in FIG. 2, can be rotated in either direction, clockwise or counterclockwise, about the central, longitudinal, axis A. A motor 7 drives a timing drive belt 8 that encircles tube 5. A typical DC motor useful in this application is model 6M 8712-31 manufactured by Pittman Corporation. The motor 7 can be driven in either direction, clockwise or counterclockwise, by signals sent from a microprocessor 20 with accompanying drive electronics. A timing belt 8 is engaged with gear 37 mounted on tube 5. The belt 8 will cause the tube 5 to rotate, as the belt 8 is rotationally driven by the motor 7. As tube 5 rotates, the helix 6 transports the pills 1 up the inside wall of the elongated incline of tube 5.

A stationary collar 9, having the same inside and outside diameters as tube 5, is positioned across a gap 66 at the upper end of the tube 5. The collar 9 is coincident with the central, longitudinal, axis of tube 5. The tube 5 and the collar 9 are slightly separated by a gap 66, so that the stationary collar 9 is fixed, while the tube 5 is caused to rotate. The helix 6 extends beyond the tube 5, across gap 66, and into the stationary collar 9. Being attached to the tube 5, the helix 6 will therefore rotate within the stationary collar 9, thus transporting pills 1 up through collar 9, and out the dispensing end 19.

As pills 1 are pushed to the lip 22 of collar 9, they fall off and down through the funnel 10, through a photodetector 11, and into the collection chute 12. Pills 1 are sensed by the photodetector 11, which sends a signal to the microprocessor 20 for each detected tablet, via line 65. The microprocessor 20 processes the signals from the photodetector 11, and keeps a running count of the total, as will be described in detail hereinbelow. The pills 1 are held in the collection chute 12 by a vertically movable door 13, which can be raised by solenoid 14. The pills 1 fall out of the collection chute 12 into a waiting vial 50, when the door 13 is raised by the solenoid 14.

The pills 1 are fed to the tube 5 via a loading mechanism, such as a hopper 2. The hopper 2 is shaped like a box, having an opening at the bottom which empties onto a plate 3. The side walls of the hopper 2 define a box in which a mass of pills, tablets or capsules are fed to the tube 5. A trough 4 disposed below the plate 3 receives the pills 1 that slide down the plate 3. The trough 4 delivers the pills 1 to the mouth 18 of the rotating, hollow tube 5 which contains the helix 6. The rotating helix 6 forces the pills 1 upwardly through the hollow tube 5, in the flow direction shown by arrows A. The pills 1 travel upwardly against the force of gravity, along the inside wall of the hollow tube 5, as the tube and the helix rotate.

The rotating tube 5 is mounted at an angle between 10 and 30 degrees (preferably, at least a nominal 20 degrees), which causes some pills 1 to tumble backwardly, limiting the number of pills 1 which lie in each turn of the helix as they approach the upper end of the helix 6.

To facilitate the pushing of the last pill off the lip 22 of the collar 9, the helix 6 is bent at its tip 39. The bend in the tip 39 is in the direction of the central, longitudinal axis A of the helix. The pitch, or, coil-to-coil distance, of the helix is effectively increased over the length of tip 39.

Tube 5 is supported at its input end 18 by bearing ring 55, in which tube 5 is free to rotate. A notch 56 in the bearing ring 55 exposes the edge of the tube 5, so that its rotation will cause tablets from trough 4 to move as they contact the lower lip of the tube 5. This movement provides enough agitation to the pill mass disposed at the input end 18, to assist its flow into tube 5.

The photodetector 11 (e.g., an infrared detector) is shown to have an IR light source 23 on one side and an array of infrared photosensors 24 on the other. As a pill 1 falls through the photodetector 11, light from the light source 23 is blocked to at least one of the photosensors 24, and the pill 1 detected, causing a signal to be sent via line 65 to the microprocessor 20, which keeps a running count of the pills 1 falling into the funnel 10. The microprocessor 20 performs an analysis on the signal from the photodetector 11. The signal's wave shape will determine whether a full or fragmented pill has been sensed. Pill fragments are eliminated from the microprocessor count. Likewise, a double passage of pills will be sensed by the photodetector 11, and the signal's wave shape will enable the microprocessor 20 to ascertain that there has been an overlap. In such a case, the microprocessor 20 will record a double count.

The helix 6 is shaped in an unusual way in order to increase the tendency of the pills 1 to singulate as they flow along the tube 5. Referring again to FIG. 2, tube 5 and helix 6 are shown in a side view. The first, short distance along helix 6 is of a lower height, as at 34. The leading edge 36 of the ridge is angled downward and to the left, so as to hold pills 1 down into the bottom of the tube 5. The trailing edge 35 of the ridge is angled downward and to the left, so that large pills 1 will not wedge into the space between the coils of the helix 6. Small nubs 40 are affixed to the leading edge 36 of the ridge, in order to tumble excess small pills 1 backwardly towards the inlet 18. Larger nubs 41 are attached to the sides of the tube 5. These nubs 41 cause excessively large pills to tumble backwardly towards the inlet 18. The leading edge 36 of the tip 39 is made vertical, in order to facilitate the movement of the pills 1 as they move over the lip 22 of collar 9.

As aforementioned, the helix 6 is rigidly attached to the tube 5, but not to the collar 9. Within collar 9, the helix 6 becomes a freestanding helix rotating therewithin, thus forcing pills 1 out the dispensing end 19. At its tip 39, the helix 6 is bent outward, in the direction that would lengthen the pitch of the helix further, so as to push the leading pill 1 off the lip 22, before the next pill reaches the edge.

Referring again to FIG. 1, with regard to the pill-feeding from the hopper 2, vibration must be provided to the hopper 3, in order to prevent bridging in the hopper area for certain pills, tablets and capsules. Vibration is provided to the hopper bottom 3 by the ridged cam 33, attached to tube 5, which imparts motion to hopper bottom 3 with rotation of tube 5. The cam 33 bears on, and transfers vibration to the plate 3, which causes pills disposed upon the plate to fall into the trough 4. The cam 33 also imparts vibration to lever 53, which is attached to chute 4; therefore, trough 4 is also vibrated.

In addition to vibration at the inlet 18, the dispensing system 100 also features another means to prevent pills 1 from jamming at the interface between chute 4 and the inlet portion 18 of the tube 5. The chute 4 is supported by a compression spring 15 at the inlet 18 interface with tube 5. On the other end, chute 4 is rotationally supported by two pivots 21. In the event that a tablet jam occurs at the point where the helix 6 picks up the pills 1 from chute 4, the chute will pivot counterclockwise (arrow 67) about its supporting pivots 21, under the weight and added force of the pill mass. The pivoting action of the chute relieves the forces influencing the tablet jam. As the jam is relieved, the compression spring 15 returns chute 4 to its original position.

Agitation of the pills 1 is also required at, and immediately around, the input 18 to the tube 5. To provide this agitation, a notch 56 in bearing ring 55 exposes the edge of tube 5 so that its rotation will cause tablets to be agitated strongly enough to keep large pills 1 flowing, but gentle enough not to break or damage the pills.

The inside diameter of the helix 6 is tapered for approximately one turn thereof, which helps to prevent the helix 6 from pinching pills and causing jams. The taper also prevents too many pills 1 from entering into the helix 6.

The pitch of the helix 6 is designed to be as large as possible, consistent with the requirement to adequately force the pills 1 upward along the tube 5. The increased pitch helps larger pills to lie flat in the bottom of tube 5, which aids in singulating them so that they approach and hurdle the lip 22 of the stationary collar 9 one at a time. The increased pitch also enlarges the center-to-center spacing of the tablets as they move along, decreasing the probability that two tablets will fall at once.

For good singulation, the height of the helical ridge 6 (toward the axis of tube 5) is designed to be high enough to feed large pills, while not so high that too many small pills reach the stationary collar 9 at once. The surface of helical ridge 6 is made as smooth as possible, so that pills will move along the bottom of the tube 5 without climbing up the side wall thereof, which would cause pills to cascade off the end of collar 9 in a close group.

The rear, or, non-driving, edge of the helical ridge 6 is beveled in the direction that would make the helix narrower at the top, so as to prevent flat pills from wedging themselves into the space between the turns of the helix. The forward or driving edge of the helical ridge 6 is beveled in the direction that would make the helix narrower at the bottom, so as to cause pills 1 to lie flat and line up in a row along the helix 6.

The elevation of tube 5 (nominally 20 degrees) is designed to be low enough to cause the pills 1 to move upwardly along the inner wall of the tube, but not so low that too many pills feed at once. The inclination must also be high enough to cause large numbers of small pills 1 to tumble backwardly, thereby reducing the number of pills 1 within any one turn of the helix. The inclination should not be so high, however, that single, large pills will tend to tumble backwards.

The speed of rotation of the tube 5 and the helix 6 is critical for correct feeding. A given type of pill will have an optimal speed. The microprocessor 20 must be programmed to regulate the speed so that pills 1 will not ascend from the bottom of the tube 5, and up the side wall thereof. Such is the case when the tube starts to rotate too fast. Pills forced along the sides of the tube tend to bunch up, and singulation will be detrimentally affected. Should the microprocessor turn the tube 5 too slowly for the pill's shape and size, then the pill-counting speed of the device will be unnecessarily reduced.

As aforementioned, the speed of the tube 5 is controlled by the rotation of the timing drive belt 8, which is powered by the motor 7. The motor 7 is controlled by the microprocessor 20 to provide the optimal speed for the type of tablet or capsule being fed into the dispensing system 100. Information about the correct speed, among other parameters, is sent to the microprocessor 20 from the dispenser-controller computer 27, upon the powering-up and initialization of the computer 27.

Information about the correct speed for each individual type of pill can be stored in a memory database, which can be periodically updated as new medications are introduced into the marketplace.

Two nubs, or, protrusions 16 are molded into the wall of the tube 5, just in front of the driving edge of the helix 6. Nubs 16 aid in aligning the pills 1 along the tube 5, and also optimize the backward tumbling of the pills. The backward tumbling of the pills reduces their number in each turn of the helix 6, which, in turn, reduces the probability that two pills will fall through the detector 11 at the same time. The action of the nubs 16 is such that, owing to their elongated shape, capsules tend to readily tumble backwardly when encountering them. Round tablets, on the other hand, do not lie in a row along the helix ridge 6, and are also tumbled backwards.

Two protrusions 17, which are smaller than the nubs 16, are mounted on the helix 6, next to the wall of the tube 5. Protrusions 17 control the size of groups of small pills 1, tumbling some backwardly to reduce the number in any one turn of the helix 6. The protrusions 17 are small enough so that large pills 1 tend to bypass or sufficiently escape them.

As aforesaid, there is a small gap 66 between the rotating tube 5 and the stationary collar 9. Pills 1 must pass across this space, which causes a jerking motion to be imparted to the forward flow of the pills. This will cause further alignment or singulation of the tablets and capsules 1 along the spiral as they approach and are fed over the lip 22 in the fast count or singulation count modes.

A series of ridges 28 disposed about the periphery of the tube 5 provide additional agitation to cause any tablets to lay flat as they approach the lip 22. The ridges 28 are small enough so as not to disturb tablets or capsules that are already bunched together in the bottom of the tube.

A detection algorithm is present in the program of the microprocessor 20. This algorithm computes the time for which the photocells 24 are blocked and unblocked, and also contains parameters that define the typical passage time of the particular pill being currently dispensed. The algorithm makes possible the control of the dispensing system 100 by the microprocessor 20. The algorithms also provide the microprocessor 20 with information that allows for the count control of overlapping pills, as well as the passage of a fragment too small to be counted in the total pill count.

The funnel 10 is shaped so as to enable and maintain the pills' longitudinal orientation for passage through the beam of the photodetector 11. The funnel 10 maintains a longitudinal orientation in the stream of pills exiting the collar 9. The longitudinal orientation in the discharge flow-stream enhances the detection algorithm's ability to detect pill fragments, or double-pill feeds.

The shape of the helix 6 changes at that portion approaching the output lip 22 of the stationary collar 9. The forward, or, driving, side of the ridge of the helix 6, which is initially angled in a direction that would make the base of the ridge narrower than the top, then becomes gradually more vertical. As aforementioned, the pitch of the helix 6 also gradually becomes longer over the length of tip 39. The vertical shaping of the end portion of the helix relieves any downward force that may be holding a pill 1 against the collar, thus allowing the first pill in the line to fall freely. Effectively increasing the pitch of the helix in its final stage 39 provides a greater center-to-center distance between pills, thus keeping a trailing, second-place pill from falling off the lip 22 at the same time as the leading tablet in the flow line.

The photodetector 11 is located sufficiently distant from the drop-off point 22 of collar 9 as possible, to allow funnel 10 to enable and maintain pill longitudinal orientation as the table or capsule approaches the detector assembly 23. This is important during the rapid counting mode. Counting in the singulation mode is described hereinafter.

The cam 29 that is attached to the rotating tube 5 at its inlet 18 is in contact with a microswitch 30. Cam 29 contains one large lobe, which turns the microswitch 30 as it rotates past the microswitch 30 in its rotation, and then subsequently turns the microswitch 30 off. At the moment that the cam 29 turns the microswitch 30 on, the tube 5 is in a rotational position, in which the final coil of the helix 6 is far advanced. In this advanced stage, no pills remain within the final turn of the helix 6. At the moment that the cam 29 turns the microswitch 30 off, the tube 5 is in a rotational position in which a group of pills 1 will be approaching the discharge end 19, comprising lip 22. The use of these switch actuations as they affect the flow of pills through the dispensing system 100 is described hereinafter, with reference to the flowchart illustrated in FIGS. 4*b* through 4*d*, which depict the motor control of the dispensing system 100 by the microprocessor 20.

The processes 200 through 300, and 400, respectively, depicted in both the flowcharts of FIGS. 3*a* through 3*e* and FIGS. 4*a* through 4*d*, operate essentially in parallel and independently of each other. The process 400 of FIGS. 4*a* through 4*d* is activated once each millisecond through a timer interrupt. The two respective processes 200 and 400 communicate through the setting of modes as variables in memory.

Multiple dispensing systems 100 can be arrayed under the control of a single dispenser-controller computer 27. Each dispensing system 100 has its own microprocessor 20. On power-up, each microprocessor 20 receives a list of control parameters from a dispenser-controller computer 27. Such parameters are used to control the way in which the drive motor 7 performs rapid drive rotation to move most of the pills through the tube 5, as well as the slower, intermediate jogging rotation of the tube 5 when a desired count has almost been reached.

In rapid counting, the motor 7 is operated at the optimal speed for the particular type of pill being counted. The unit switches over to a singulation mode (intermittent jogging), when the pill count approaches within a given number of the target count, e.g., within three tablets of a total tablet count.

Based upon the particular size and shape of the tube 5 and the helix 6, the dispensing system 100 is capable of delivering a certain number of pills with each turn of the helix. The average number of pills in a group will vary, depending on their size and shape, but this number can be determined in advance, and the information stored.

Based upon this number, the system 100 is able to enter into a singulation mode far enough in advance of the target count to ensure that an exact target count will be obtained. The point at which the switch to singulation mode occurs is called the singulation start point.

The parameter passed to the microprocessor 20 is the maximum group size, which is the maximum number of pills of a particular type that can be dispensed by the tube-helix combination during any one revolution. This value is used to calculate a stored, internal value, previously referred to as the singulation start count. The singulation start count is that count by which the unit enters the singulation mode. The singulation start count is calculated as follows: [singulation start count]=[target count]−([maximum group size]−1).

The singulation mode is that intermittent mode in which pills are dispensed one at a time from the lip 22 of the collar 9, in order to achieve a final target count. As described above, the cam 29 turns the microswitch 30 off at that point in the rotation of the tube 5 at which the singulation action should begin. When a group of pills is near the output edge of the stationary collar 9, the microprocessor 20 pulses, stops and reverses the motor 7 in such a way as to agitate and cause the next pill in line to tip over the lip 22 of the collar 9, fall, and pass through the photodetector 11. As each pill drops from the lip 22 and is detected, the motor 7 (and, therefore, the helix 6) is quickly reversed for a short duration so as to allow the group of pills in the collar 9 to resettle at the bottom thereof, and back away from the lip 22. The process is then repeated until the desired, predetermined count is obtained. The helix is then reversed one last time, allowing any remaining pills to move back away from the lip of the collar 9, to prevent additional ones from dropping off the edge of the lip 22, after the final pill which provides the target count is detected. Counting is then complete.

During singulation, the group of pills within the last coil of the helix may already have been dispensed before the target count is reached. This is detected by the microswitch 30, which is turned on by the cam 29 when the final coil of the helix is so far advanced that no pills could still be therein. In an effort to save time, the system will then advance rapidly to the next pitch of the helix, thereby pushing the next group of pills to the vicinity of the collar lip 22, but not so far that any of the pills would be dispensed. The cam 29 turns the microswitch 30 off when the rotation of the tube 5 has reached this point. The cam 29 is fixed to the tube 5, and is not adjustable. The microswitch 30 is also fixed in position and is not adjustable.

After the next group of pills advances to the point indicated by the turning of microswitch 30 to its off position by cam 29, the helix is allowed to rotate for some duration in order to further bring the group of pills even closer to the lip 22. This duration is a parameter that is measured in milliseconds. This parameter is passed to the system microprocessor 20; it, in turn, depends upon the size of the pill, the size of the group of pills, and other pill characteristics being dispensed in that system.

The following parameters are also passed to the microprocessor 20, based upon the type of pill:

1) The forward pulse duration, in milliseconds, is the duration of the main pulse that drives the next pill from the collar lip 22.
2) The forward pulse pause, in milliseconds, is the duration of the pause between pulses.
3) The pill-drop reverse time, in milliseconds, is the amount of time that the helix will be driven in reverse after each detected pill, thereby allowing the group of pills to resettle back into the center of the collar.
4) The jog count is used with particularly difficult tablets and capsules, where an additional jogging motion is required. The jog count specifies a certain number of forward pulses, after which the helix is reversed a certain amount of time to let the pills settle.
5) The jog reverse time, in milliseconds, specifies the duration of the reversal after the specified number of forward pulses has taken place.

The microprocessor 20 senses the signal produced by the photodetector 11, and computes the durations of pulses produced as pills fall through. The microprocessor 20 is sent the following information:

1) The minimum pill width, in milliseconds, is the shortest amount of time that this particular type of pill has taken to pass through the photodetector beam. Once established, any shorter pulses may be considered to be pill fragments and discarded in the final count.
2) The maximum pill width, in milliseconds, is the longest amount of time that this particular type of pill takes to pass through the photodetector beam. Once established, the microprocessor can also distinguish doubles, because any pulses of longer duration can be considered to be two pills falling through the beam, despite the fact that the photodetector will provide a single pulse due to their closeness as they pass the sensors.
3) Pill-to-pill separation, in milliseconds, is the shortest time in milliseconds between two successive pills of this type as they pass through the detector. Pills may safely be considered to be separate, when two pills are in fact separated by more than this time.

The flowcharts illustrate the microprocessor 20 informing the dispenser-controller computer 27 when counting is complete. The dispenser-controller computer 27 then executes a protocol to inform a technician or pharmacist of the next order to fill. Thereafter, when it is time for this particular dispenser to dispense pills, the computer 27 informs the microprocessor 20, which turns on the dispenser's indicator light. The computer 27 may also print a label and request the technician or pharmacist to place it on a vial, applying the barcode on the label. After checking that the barcode represents the correct prescription, the computer 27 asks the technician or pharmacist to fill the vial from the dispenser. The placement of the vial under the dispenser by the technician or pharmacist activates the microswitch 50. The microprocessor 20 then actuates the solenoid 14 to open the door 13 and dispense the pills into the vial. The release-door switch 54 informs the microprocessor 20 as to whether the door 13 is open or closed.

Figure 5:
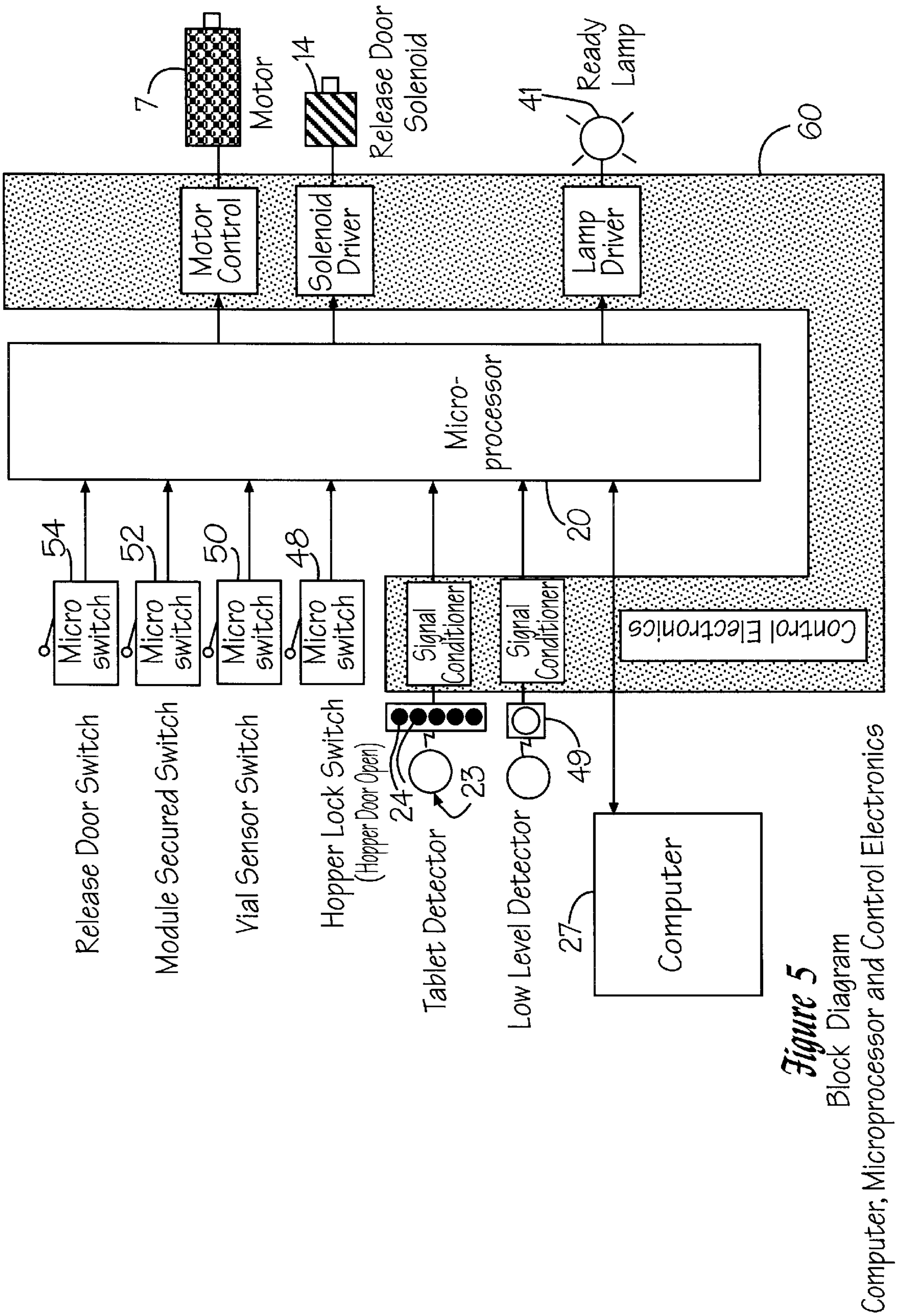
FIG. 5 illustrates a schematic, diagrammatic view of the electronic, computerized circuit of the pill-dispensing system depicted in FIG. 1.

Referring to FIG. 5, the electronic, computerized circuit of the pill-dispensing system 100 of this invention is illustrated. The circuit 60 contains a number of sensor- and drive amplifiers that service the respective components of the system, e.g., the motor 7, the release-door solenoid 14, the ready indicator 41, the pill-detecting apparatus 23 and 24, and the low-level detecting apparatus 49 for the hopper 2. The release-door switch 54, the module-secured switch 52, the vial-sensor switch 50, the hopper-door switch 48, the pill detector 23, the low-level detector 49, the motor 7, the release-door solenoid 14, and the indicator lamp 41 are all shown in FIG. 1, and will be more fully described in the following explanation of the flowcharts.

As aforementioned, the processes 200 and 400, respectively, which are depicted in the flowchart of FIGS. 3*a* through 3*e* and the flowcharts of FIGS. 4*a* through 4*d*, operate essentially in parallel and independently of each other. The processes 300 and 400 of FIG. 4*a* and FIGS. 4*b* through 4*d*, respectively, are activated once each millisecond through a timer interrupt. The respective processes 200 and processes 300 and 400 communicate through the setting of modes as variables in memory.

Now referring to FIGS. 3*a* through 3*e*, the process 200 is illustrated. This process entails the dispensing routines.

Figure 3A:
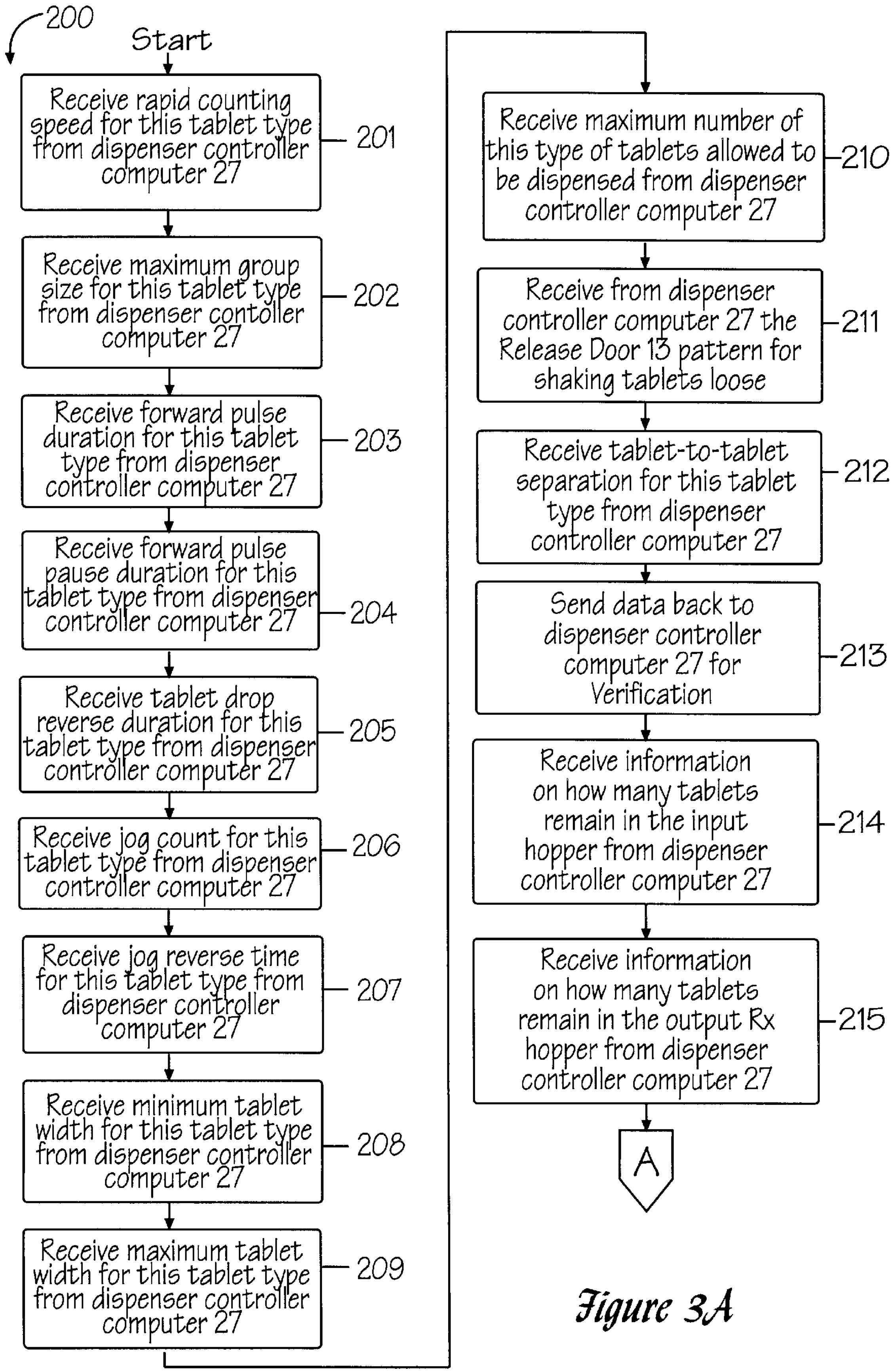
FIGS. 3*a* through 3*e* show a flowchart diagram of the operation of the pill-dispensing system illustrated in FIG. 1.
Figure 3B:
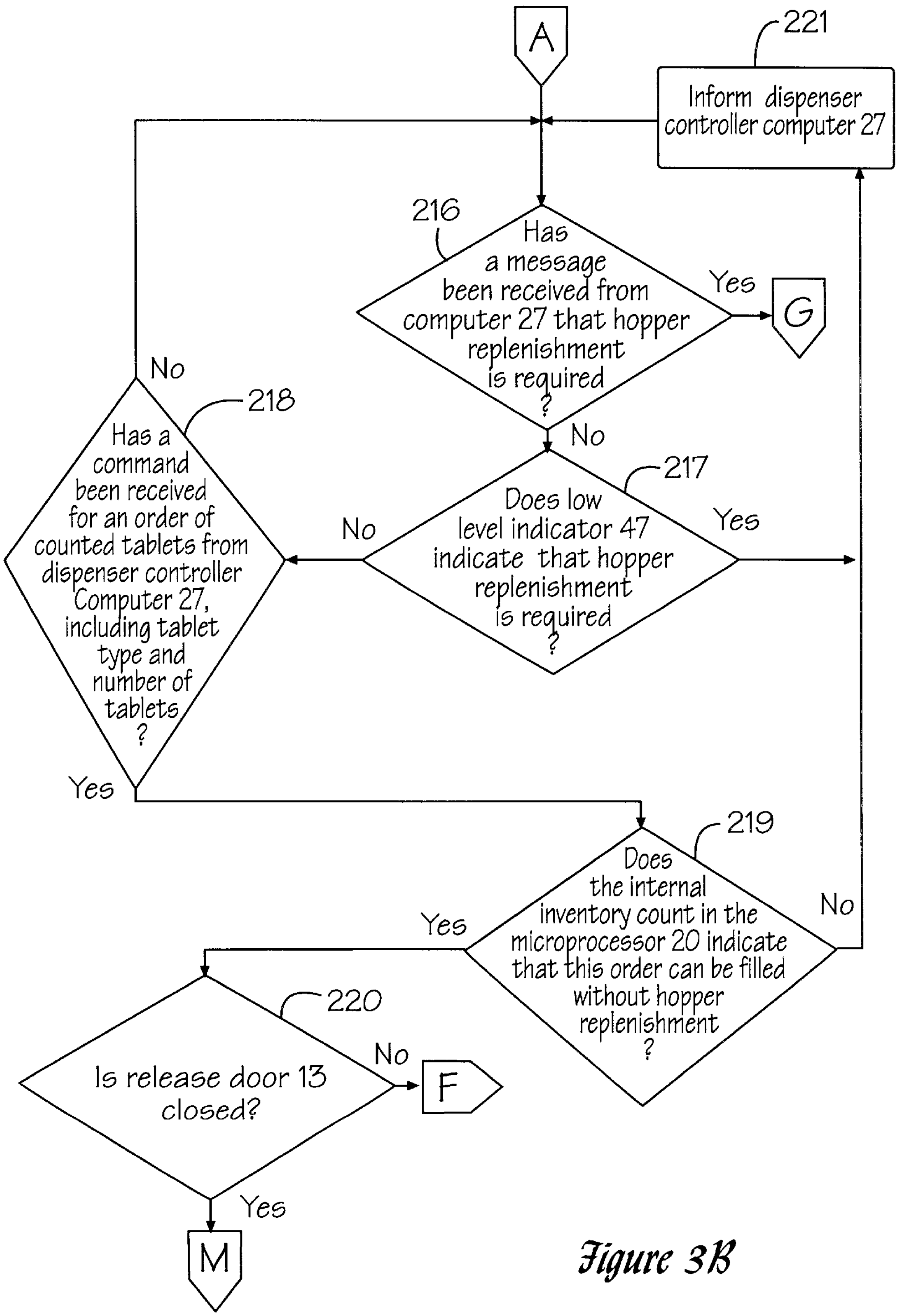
Figure 3C:
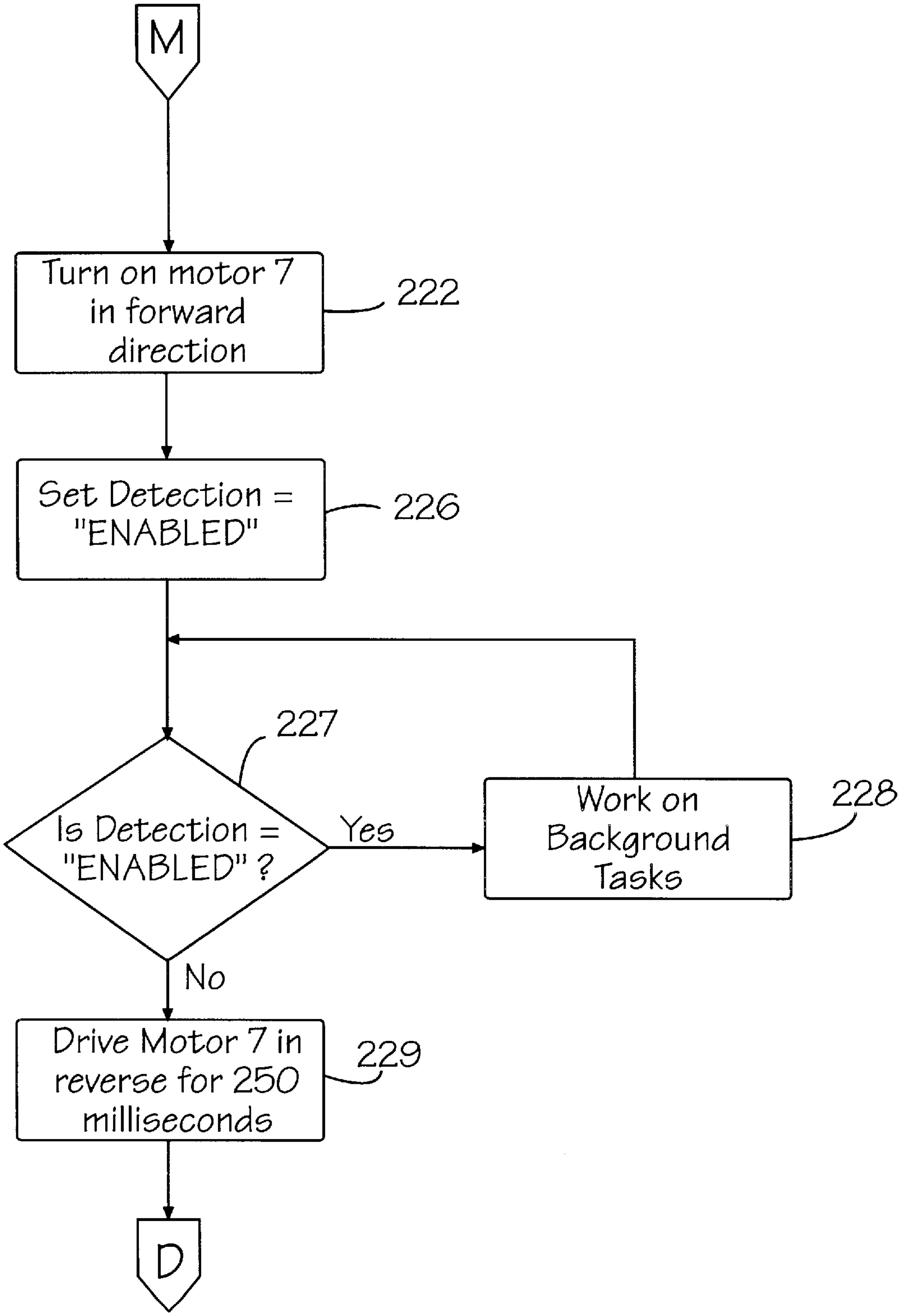

After the powering and initialization of the microprocessor 20 and the controller computer 27, the rapid-counting speed is communicated to the microprocessor 20 from the controller computer 27, step 201. The rapid-speed information is specific to the type of pill being dispensed. This information is necessary in order to rotate the combination of the tube 5 and the helix 6 at the most efficient speed. The maximum group size for this pill type is also communicated from the dispenser-controller computer 27, step 202. Other information for this particular type of pill is communicated to the microprocessor, including: the forward pulse duration, step 203, the forward-pulse pause duration, step 204, the pill-drop reverse duration, step 205, the jog count, step 206, the jog-reverse time, step 207, the minimum and maximum pill widths, steps 208 and 209, respectively, the maximum number of this type of pill to be dispensed, step 210, the pattern for operating the release door 13 in order to shake clogged pills loose, step 211, and the pill-to-pill separation information, step 212. The computer routine then inquires whether this information has been received, step 213. The system then inquires as to how many pills remain in the hopper 2, step 214. The routine next inquires just how many pills remain in the dispensing chute 12, step 215. Decision step 216 is then entered (FIG. 3*b*). When the question of whether hopper replenishment is required is answered with a "no", decision step 217 is then entered.

If hopper replenishment is required, as per decision step 216, then the system is so informed.

If the low-level indication does not suggest replenishment, step 217, then the system determines whether an order for pills has been received from the computer 27, step 218. If not, then decision step 216 is re-entered. If yes, then the system asks whether there are enough pills in the inventory, so that the order can be filled without replenishment being necessary, step 219. If the answer is no, then the computer 27 is informed, step 221, and decision step 216 is re-entered. If yes, then the system asks whether the release door 13 is closed, step 220. If yes, then step 222 is entered (FIG. 3*c*); if not, then the system reports faulty operation to the computer 27, step 223 (FIG. 3*a*). The pharmacist or technician is then instructed to await further instructions, step 224.

If the release door is closed, step 220, the motor 7 is turned on in the forward direction, step 222. The set detection="enabled" signal is instructed to be given, step 226, and then the system inquires as to whether the detection signal has been set enabled, step 227. If yes, microprocessor 20 is freed to work on background tasks, step 228. Thereafter, the decision step 227 is re-entered. If the answer to the question is no, then drive motor 7 is reversed for a predetermined period of time, typically 250 milliseconds, step 229.

Figure 3D:
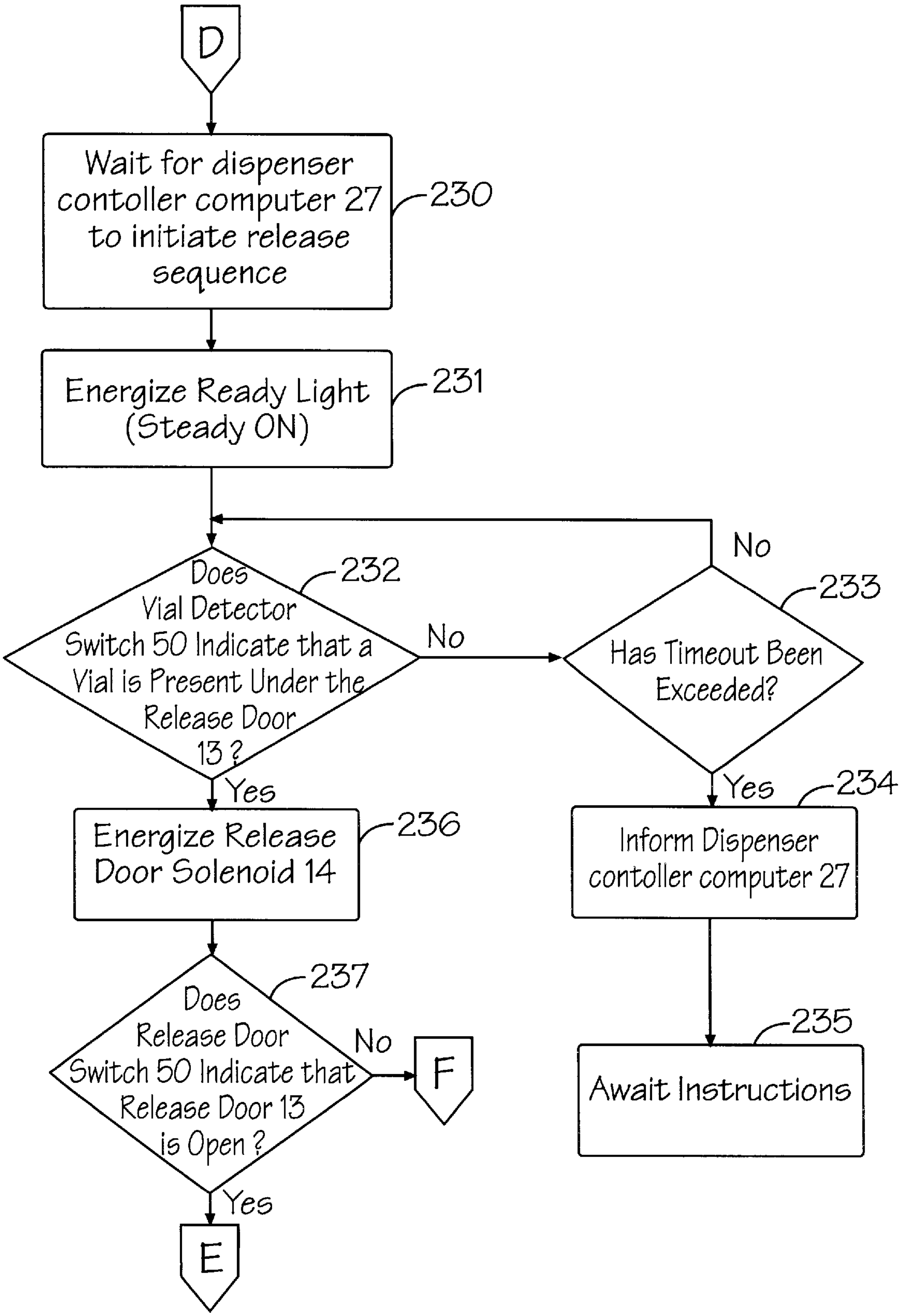
Figure 3E:
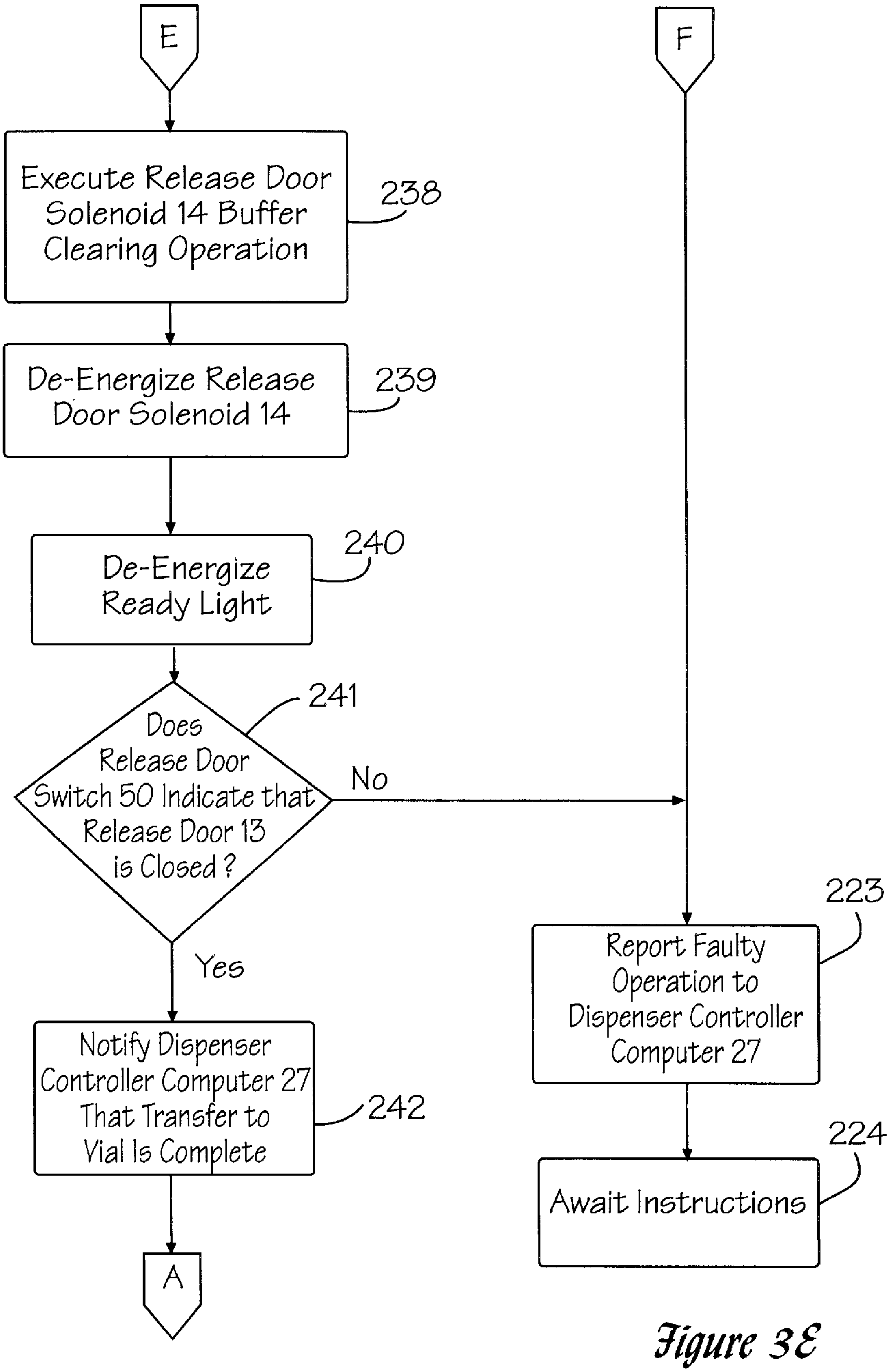

After computer 27 has issued a release command, the release sequence is then initiated, step 230 (FIG. 3*d*). The ready light is then energized, step 231. The routine then asks whether a vial is present under the release door 13, step 232. If not, the system determines whether a predetermined time-out has been exceeded, step 233. The computer 27 is then informed of the time-out and microprocessor 20 awaits further instructions, steps 234 and 235. If the time-out has not been exceeded, step 232 is re-executed. If a vial is present under the door 13, then the door release is energized, step 236. If the release-door switch 50 indicates that there is a release, step 237, the routine proceeds to step 238 in FIG. 3*e*; if there has been no release, then the steps 223 and 224 are performed, as previously described.

The system releases the door controlled by solenoid 14, step 238, and the solenoid 14 is de-energized, step 239. The system de-energizes the ready light, step 240, after which the system inquires as to whether the indicator switch 50 shows that the release door 13 is closed, step 241. If not, then steps 223 and 224 are performed, as before. If yes, then computer 27 is informed that the transfer to the vial has been completed, step 242. Having accomplished this, the routine re-enters decision step 216 (FIG. 3*b*).

Figure 4A:
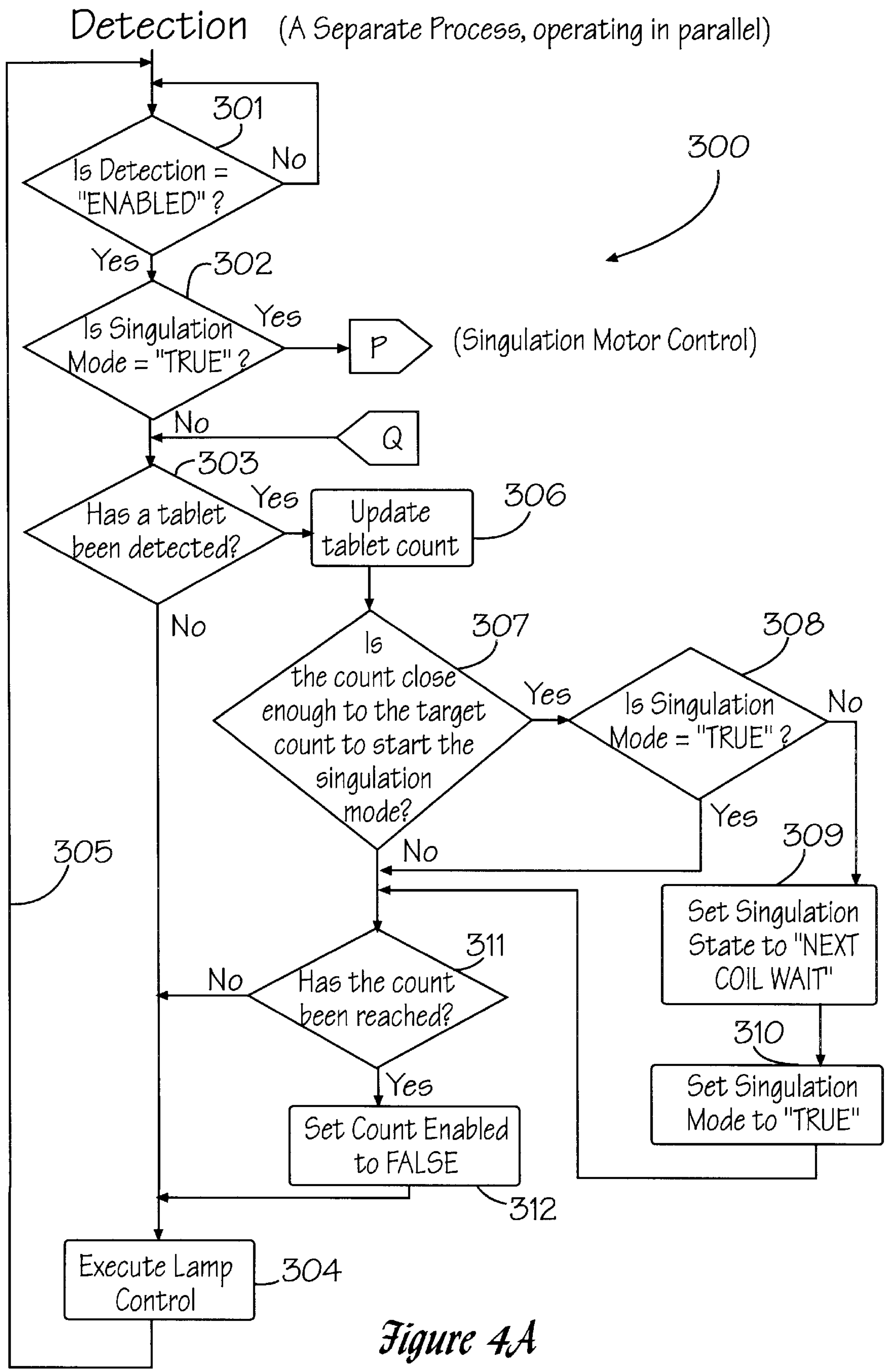
FIG. 4*a* depicts a flowchart diagram illustrating the detection of pills as they are dispensed from the dispensing system shown in FIG. 1.
Figure 4B:
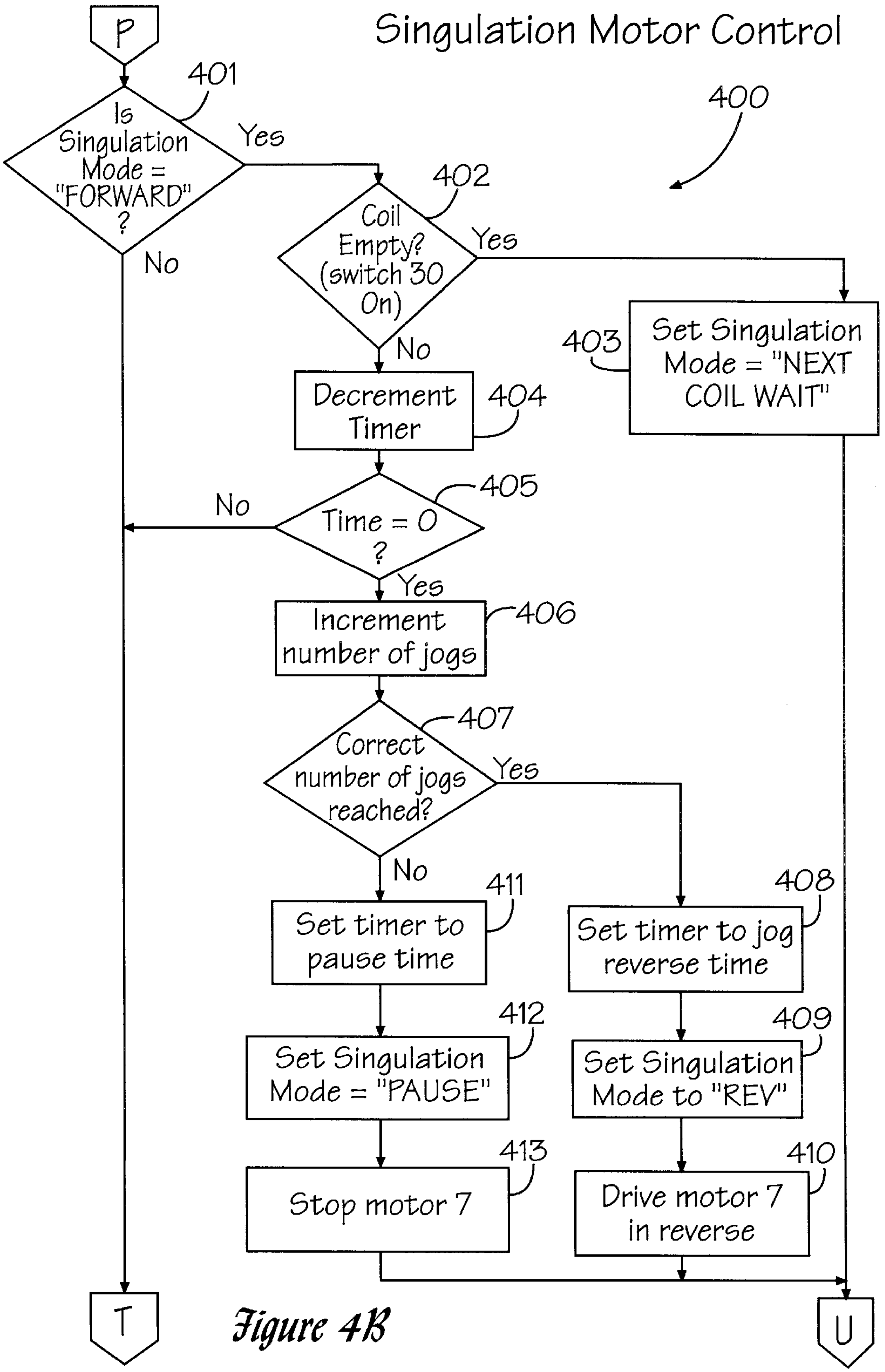
FIGS. 4*b* through 4*d* show a flowchart diagram of the singulation motor-control for the pill-dispensing system illustrated in FIG. 1.
Figure 4C:
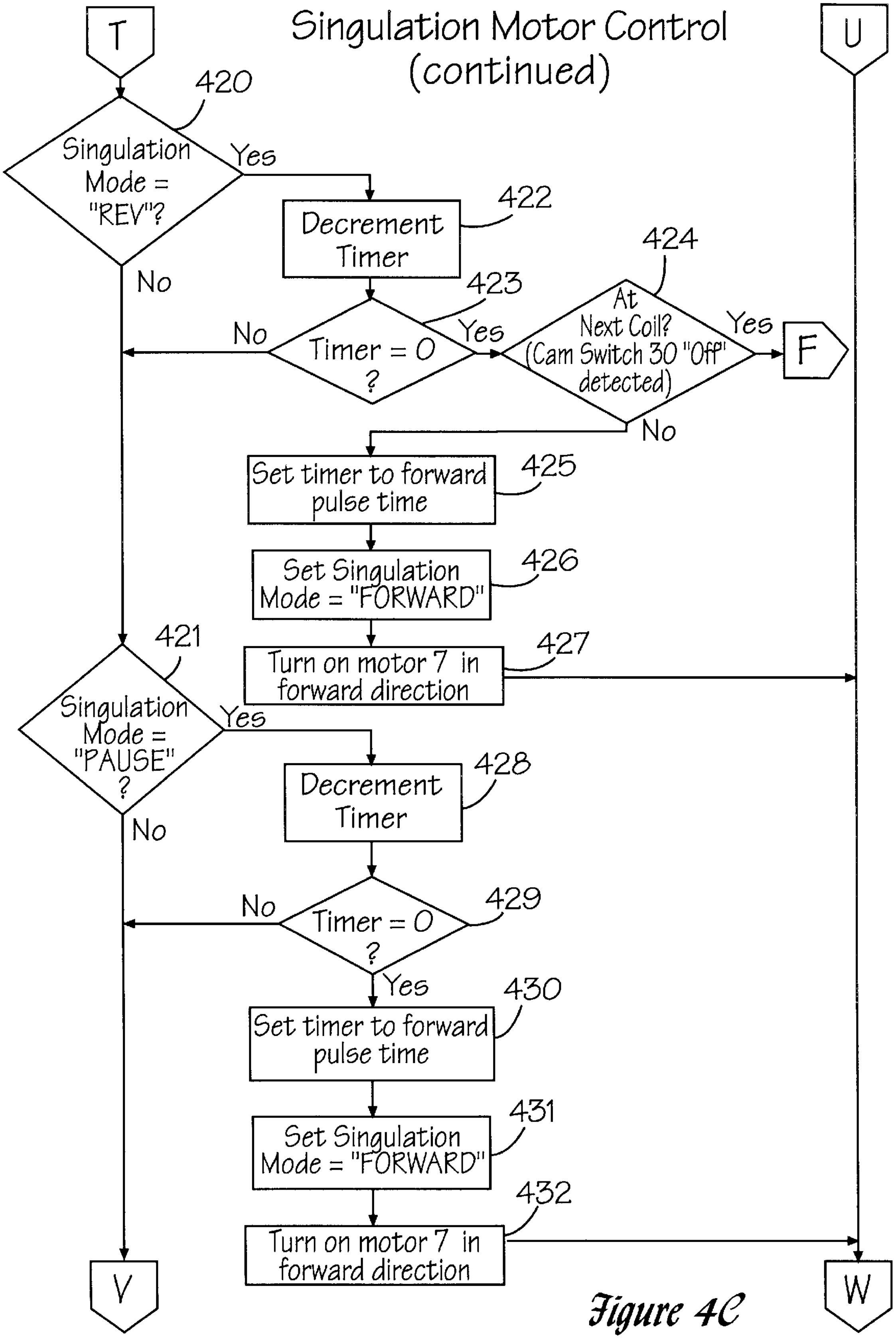

Now referring to FIG. 4*a*, the process 300 of detection is illustrated. After powering and initializing the computer and the microprocessor, the detection program is operative. The system determines if detection is enabled, step 301. If not, the system waits until it is determined that detection is enabled, step 301. If the singulation mode is on, step 302, the routine jumps to the singulation motor-control routine 400 (FIG. 4*b*). If the singulation mode is not "TRUE", then the system determines whether a pill has been detected, step 303. If not, the lamp control is executed, step 304, and decision step 301 is re-entered via line 305. If a pill has been detected, step 303, then the pill count is incremented based on output from the detection algorithm, step 306. The system then determines whether the count is close enough to the target count to begin singulation mode, step 307. If so, the system determines whether singulation mode is still "TRUE", step 308. If not, the singulation state is set to "NEXT COIL WAIT", step 309, and the singulation mode is set to "TRUE", step 310. It is then decided whether the count has been reached, step 311. If not, the lamp control is executed, step 304, and the decision step 301 is re-entered, via line 305. If the count has been reached, step 311, the count enabled is set to "FALSE", step 312, before lamp control is executed, step 304. The decision step 301 is then re-entered, via line 305.

Referring to FIG. 4*b*, the singulation motor-control process 400 and decision step 401 are entered, as aforementioned, from decision step 302 of FIG. 4*a*. If the system determines that singulation mode is not running forward, step 401, then the routine jumps to the decision step 420 of FIG. 4*c*. If yes, however, the system determines whether the switch 30 is on, step 402. Switch 30 indicates a jam at the inlet 18 of the tube 5. If the answer is yes, the singulation mode is set to "NEXT COIL WAIT" state, step 403. The routine then jumps to the detection process 300 of FIG. 4*a*, and enters the decision step 303. If the answer is no (switch 30 is off), step 402, then the timer is decremented, step 404. If the time has not reached zero, however, step 405, then the routine jumps to decision step 420 of FIG. 4*c*. If the time has reached zero, however, step 405, the number of jogs of the tube 5 is incremented, step 406. The system determines whether the correct number of jogs has been reached, step 407. If yes, the timer to jog-reverse time is set, step 408, the singulation mode is set to "REVERSE", step 409, and the drive motor 7 is reversed, step 410.

The routine then jumps to decision step 303 of the detection program of FIG. 4*a*. If the correct number of jogs has not been reached, step 407, then the timer is set to pause-time, step 411, the singulation mode is set to "PAUSE", step 412, and motor 7 is stopped, step 413. The routine then jumps to decision step 303 (FIG. 4*a*).

In jumping to decision step 420 from either step 401 or step 405, the program determines whether the singulation mode is in the "REVERSE" state. If it is not, step 420, then the program determines whether the singulation mode is in the "PAUSE" state, step 421. If not, the program jumps to decision step 450 in FIG. 4*d*.

If the singulation mode is "REVERSE", step 420, the timer is decremented, step 422, and the system determines whether the timer is zero, step 423. If not, then the decision block 421 is entered. If the timer is at zero, step 423, the program determines whether the cam switch 30 is off, step

424. If yes (the cam switch is off), the routine jumps to process 200 and step 223 of FIG. 3*e*. If not, the timer is set to forward pulse-time, step 425, the singulation mode is set to "FORWARD", step 426, and the motor 7 is rotated in the forward direction, step 427. The routine then jumps to the process 300 and decision step 303 of FIG. 4*a*.

If the singulation mode is in the pause state, step 421, the timer is decremented, step 428,and the timer is checked, step 429. If the timer is at zero, step 429, then the system sets the timer to forward-pulse time, step 430, singulation mode is set to "FORWARD", step 431, and the motor 7 is rotated in the forward direction, step 432. The program then jumps to process 300 and step 303 in FIG. 4*a*.

Figure 4D:
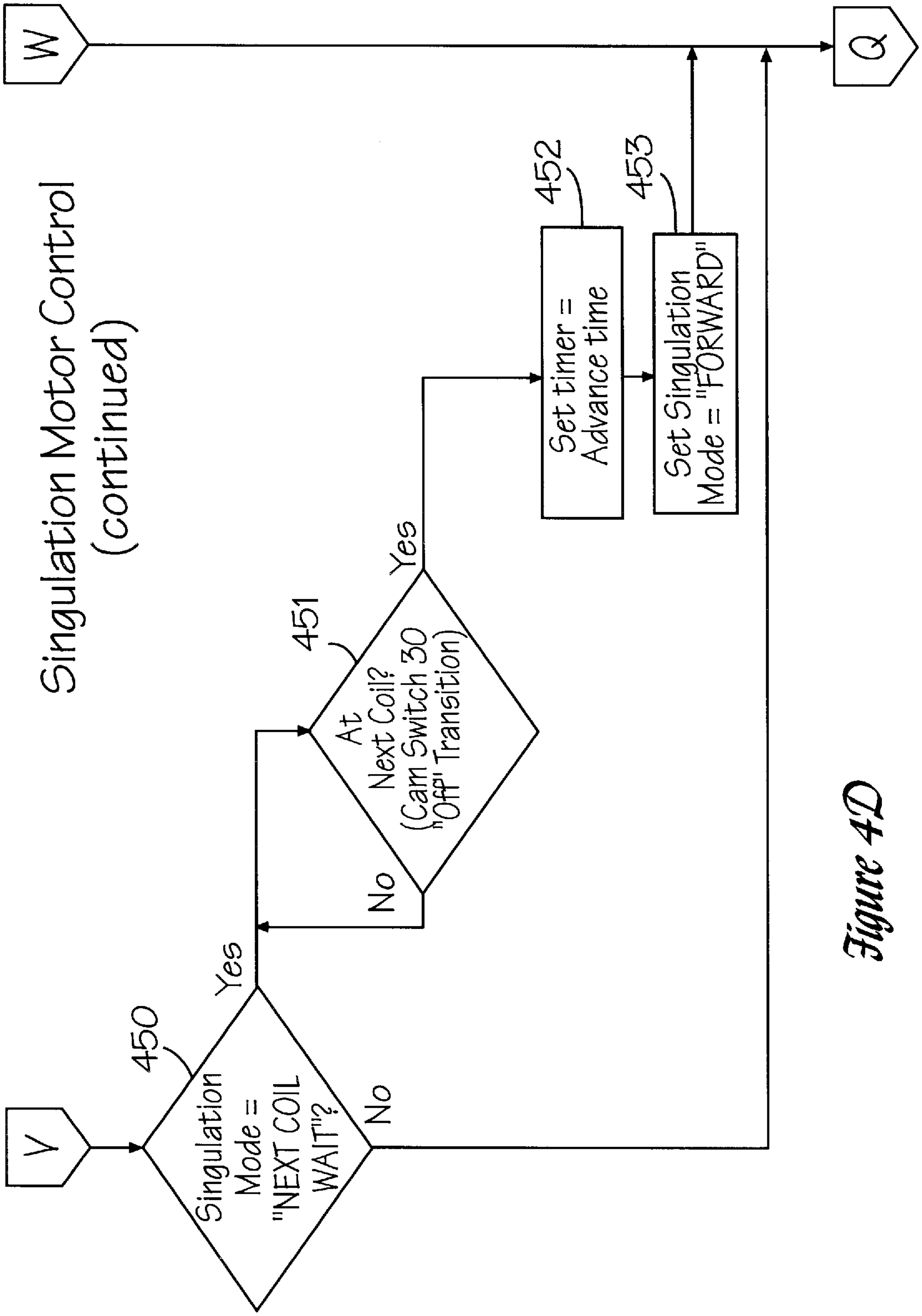

The decision step 450 of FIG. 4*d* is entered from decision block 421 (FIG. 4*c*), as aforementioned, when the singulation mode is in the pause state. If the singulation mode is not at the "NEXT COIL WAIT" state, step 450, the routine jumps to process 300 and step 303 of FIG. 4*a*. If the singulation mode is at the "NEXT COIL WAIT" state, step 450, the system determines whether the cam switch 30 is off, step 451. If switch 30 is on, step 451, then the inquiry, step 451, is repeated. When the answer becomes yes (switch 30 is turned off), step 451, the timer is set to advance time, step 452, and the singulation mode is set to "FORWARD", step 453. The routine then jumps to the process 300 and decision step 303 of FIG. 4*a*.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A workstation for dispensing a wide variety and range of pills of various shapes and sizes, said workstation comprising a plurality of physically standardized modules that are each electronically controlled and modified by their own specifically programmed microprocessor to provide diversity therein to dispense a specifically-shaped and -sized pill, said standardized modules each comprising:

temporary storage means for receiving a bulk loading of a number of pills, tablets, or capsules;

a hollow, elongated tube having a longitudinal axis defining a flow direction for pills disposed therein, from an inlet end to a dispensing end, said hollow, elongated tube having an inner wall that supports a helix, said hollow, elongated tube being rotatably supported so that said helix will cause said pills disposed within said hollow, elongated tube to singulate along said longitudinal axis, said hollow, elongated tube being in operative communication with said temporary storage means to receive a quantity of pills therefrom at said inlet end, in order to singulate said quantity and dispense said quantity from said dispensing end substantially one at a time;

drive means operatively connected to said hollow, elongated tube for rotating said hollow, elongated tube so that said quantity of pills will travel along said hollow, elongated tube in said flow direction; and a programmed microprocessor operatively connected to said drive means for specifically actuating said drive means to provide diversity in said module drive in order to dispense a specifically-shaped and -sized pill in a manner conforming to said specifically-shaped and -sized pill.

2. A workstation for dispensing a wide variety and range of pills of various shapes and sizes, said workstation comprising a plurality of physically standardized modules that are each electronically controlled and modified by their own specifically programmed microprocessor so as to provide diversity in each module to dispense a specifically-shaped and -sized pill, said workstation comprising:

a plurality of physically standardized modules, each of which includes:

a) temporary storage means for receiving a bulk loading of a number of pills, tablets, or capsules;

b) a hollow, elongated tube having an inlet end and a dispensing end defining a flow axis therebetween, said hollow, elongated tube being rotatably supported so that said pills disposed therewithin will be caused to singulate along said flow axis, said hollow, elongated tube being in operative communication with said temporary storage means to receive a quantity of pills therefrom at said inlet end, in order to singulate and dispense said quantity from said dispensing, end substantially one at a time;

c) drive means for rotating said hollow, elongated tube so that said quantity of pills will travel along said hollow, elongated tube alone said flow axis; and a programmed computer operatively connected to each drive means of said plurality of physically standardized modules for electronically modifying and controlling each module on an individual basis, said programmed computer rotationally controlling each module to provide dispensing of said specifically-shaped and -sized pill disposed therein.

3. A device for dispensing pills, comprising:

temporary storage means for receiving a bulk loading of a number of pills, tablets, or capsules;

a hollow, elongated tube having an inlet end, a dispensing end, and a longitudinal axis defining a flow direction for pills disposed therebetween, from said inlet end to said dispensing end, said hollow, elongated tube having an inner wall that supports a helix, said hollow, elongated tube being rotatably supported such that said helix will cause said pills disposed within said hollow, elongated tube to singulate along said longitudinal axis, said hollow, elongated tube being in operative communication with said temporary storage means to receive a quantity of pills therefrom at said inlet end, in order to singulate and dispense said quantity from said dispensing end substantially one at a time;

drive means operatively connected to said hollow, elongated tube for rotating said hollow, elongated tube so that said quantity of pills will travel along said hollow, elongated tube in said flow direction; and a specifically programmed microprocessor operatively connected to said drive means of said hollow, elongated tube, for electronically controlling said drive means to drive said hollow, elongated tube in an individualized manner for dispensing a specifically-sized and -shaped pill disposed therein.

4. A device for dispensing pills, comprising:

temporary storage means for receiving a bulk loading of a number of pills, tablets, or capsules;

a hollow, elongated tube having a longitudinal axis defining a flow direction for pills disposed therein, from an inlet end to a dispensing end, said hollow, elongated tube having an inner wall that supports, and is attached to a helix so that said tube and said helix are rotatable together as a single unit, said hollow, elongated tube being rotatably supported so that said helix will cause said pills disposed within said hollow, elongated tube to singulate along said longitudinal axis, said hollow, elongated tube being in operative communication with said temporary storage means to receive a quantity of pills therefrom at said inlet end, in order to singulate said quantity and dispense said quantity from said dispensing end substantially one at a time;

drive means operatively connected to said hollow, elongated tube for rotating said hollow, elongated tube such that said quantity of pills will travel along said hollow, elongated tube in said flow direction; and a specifically programmed microprocessor operatively connected to said drive means of said hollow, elongated tube, for electronically controlling said drive means to drive said hollow, elongated tube in an individualized manner for dispensing a specifically-sized, and -shaped pill disposed therein.

5. The device in accordance with claim 4, wherein said hollow, elongated tube further comprises a collar disposed at said dispensing end, said collar being supported independently of said rotatable tube and being stationary with respect thereto, said helix extending into said collar and rotating therein.

6. The device in accordance with claim 5, wherein said hollow, elongated tube is separated from said collar by a gap.

7. The device in accordance with claim 2, wherein said programmed computer further comprises means for controlling each module so as to provide dispensing of longitudinally-shaped and -sized pills.

8. The device in accordance with claim 4, wherein said helix is bent at a dispensing end thereof.

9. The device in accordance with claim 4, wherein said helix forms a ridge within said tube, and further wherein said ridge is flattened over a portion thereof.

10. The device in accordance with claim 4, wherein said hollow, elongated tube further comprises at least one protrusion disposed on an inner wall thereof, said protrusion interrupting a flow of said pills along said longitudinal axis of said tube.

11. The device in accordance with claim 4, wherein said hollow, elongated tube further comprises at least one means disposed therein for interrupting the flow of said pills along said longitudinal axis of said tube.

12. The device in accordance with claim 4, wherein said temporary storage means further comprises a trough for feeding a quantity of said pills to said inlet of said tube.

13. The device in accordance with claim 12, wherein said trough is biasly supported, so that if a jam of pills occurs at said inlet of said tube, said trough will yield to substantially eliminate said jam.

14. The device in accordance with claim 4, wherein said longitudinal axis of said tube is inclined with respect to a horizontal axis.

15. The device in accordance with claim 14, wherein said longitudinal axis of said tube is inclined with respect to a horizontal axis in an approximate range of 10 to 30 degrees.

16. The device in accordance with claim 14, wherein said longitudinal axis of said tube is inclined with respect to a horizontal axis of approximately 20 degrees.

17. The device in accordance with claim 4, further comprising a photodetecting device disposed adjacent said dispensing end of said tube for sensing a pill as it is dispensed therefrom.

18. The device in accordance with claim 4, wherein said drive means comprises means for imparting a reversible, rotational movement to said tube and said helix.

19. The device in accordance with claim 4, wherein said drive means comprises a reversible motor for reversing a rotational direction of said tube and said helix.

20. An interactive workstation for dispensing a wide variety and range of pills of various shapes and sizes, said workstation comprising:

a hollow, elongated tube movably supported such that said pills disposed within said hollow, elongated tube will be caused to singulate along said longitudinal axis of said hollow, elongated tube, said tube being in operative communication with said container so as to receive a quantity of pills therefrom at an inlet end, in order to singulate and dispense said quantity from a dispensing end substantially one at a time;

drive means for moving said hollow, elongated tube, said drive means comprising a cam and a gear for imparting regulated vibration to said hollow, elongated tube, and a timing drive belt for imparting rotational movement thereto;

a microprocessor operatively connected to said drive means of each hollow, elongated tube, and having a program for controlling each module on an individual basis, said programmed computer controlling movement of each module to provide dispensing of said specifically-shaped and -sized pill disposed in each module, said program comprising a routine for intermittently moving said tube of each module as a quantity of dispensed pills approaches a target amount; and a computer operatively connected to each microprocessor for instructing an operator in a prescription filling operation sequence.

21. The device in accordance with claim 20, further comprising a funnel disposed downstream said dispensing end of said hollow, elongated tube, said funnel being adapted to maintain longitudinal orientation of predetermined pills.

* * * * *